US012796614B2

(12) United States Patent
Li et al.

(10) Patent No.: US 12,796,614 B2
(45) Date of Patent: Nov. 17, 2026

(54) PICKING ROBOT, FRUIT POSITIONING METHOD AND APPARATUS THEREFOR, ELECTRONIC DEVICE, AND MEDIUM

(71) Applicant: Research Center of Intelligent Equipment, BAAFS, Beijing (CN)

(72) Inventors: Tao Li, Beijing (CN); Qingchun Feng, Beijing (CN); Xin Guo, Beijing (CN)

(73) Assignee: Research Center of Intelligent Equipment, BAAFS, Beijing (CN)

( * ) Notice: Subject to any disclaimer, the term of this patent is extended or adjusted under 35 U.S.C. 154(b) by 93 days.

(21) Appl. No.: 18/724,029

(22) PCT Filed: Apr. 3, 2024

(86) PCT No.: PCT/CN2024/085705
§ 371 (c)(1),
(2) Date: Jun. 25, 2024

(87) PCT Pub. No.: WO2025/077121
PCT Pub. Date: Apr. 17, 2025

(65) Prior Publication Data

US 2026/0041038 A1 Feb. 12, 2026

(30) Foreign Application Priority Data

Oct. 9, 2023 (CN) ........................ 202311296030.7

(51) Int. Cl.
*A01D 46/30* (2006.01)
*B25J 9/16* (2006.01)
(Continued)

(52) U.S. Cl.
CPC ............ *A01D 46/30* (2013.01); *B25J 9/1682* (2013.01); *B25J 9/1697* (2013.01);
(Continued)

(58) Field of Classification Search
CPC ....... A01D 46/30; B25J 9/1682; B25J 9/1697; B25J 11/0045; B25J 9/0084; B25J 19/023;
(Continued)

(56) References Cited

U.S. PATENT DOCUMENTS

2023/0399136 A1* 12/2023 Budu ..................... B25J 9/0084
2025/0081892 A1* 3/2025 Lu .......................... B25J 9/1697

FOREIGN PATENT DOCUMENTS

CN 113812262 * 12/2021
CN 114260895 * 4/2022
(Continued)

*Primary Examiner* — B M M Hannan
(74) *Attorney, Agent, or Firm* — Millen, White, Zelano & Branigan P.C.; William F. Nixon

(57) ABSTRACT

A picking robot, a fruit positioning method and apparatus therefor, an electronic device, and a medium are provided. The robot includes a robot body including a processor and a plurality of robotic arms. A plurality of first image collection modules and one second image collection module are mounted on the robot body. Each robotic arm has one corresponding first image collection module mounted nearby. Each first image collection module does not interfere with the corresponding robotic arm. The second image collection module is mounted at a position of a base of the robot body. The processor is configured to determine, based on fruit tree images of respective sub-areas in an operation area that are collected by respective first image collection modules and the base coordinate system, global fruit positioning distribution information of the operation area, and control the robotic arms to perform collaborative operation.

15 Claims, 4 Drawing Sheets

(51) Int. Cl.

*B25J 11/00* (2006.01)
*G06T 7/73* (2017.01)
*G06V 10/25* (2022.01)
*G06V 10/762* (2022.01)
*G06V 20/68* (2022.01)

(52) U.S. Cl.

CPC ............. *B25J 11/0045* (2013.01); *G06T 7/73* (2017.01); *G06V 10/25* (2022.01); *G06V 10/762* (2022.01); *G06V 20/68* (2022.01); *G06T 2207/10028* (2013.01); *G06V 2201/07* (2022.01)

(58) Field of Classification Search

CPC .. B25J 5/007; G06T 7/73; G06T 2207/10028; G06V 10/25; G06V 10/762; G06V 20/68; G06V 2201/07
USPC .......................................................... 700/259
See application file for complete search history.

(56) References Cited

FOREIGN PATENT DOCUMENTS

| | | | |
|---|---|---|---|
| CN | 115338843 | * | 11/2022 |
| CN | 116385640 | * | 7/2023 |
| CN | 116439018 | * | 7/2023 |
| CN | 116686547 | * | 9/2023 |
| CN | 116704353 | * | 9/2023 |

* cited by examiner

PICKING ROBOT, FRUIT POSITIONING METHOD AND APPARATUS THEREFOR, ELECTRONIC DEVICE, AND MEDIUM

CROSS-REFERENCE TO RELATED APPLICATION

This application is a national stage of International Application No. PCT/CN2024/085705, filed on Apr. 3, 2024, which claims the benefit and priority of Chinese Patent Application No. 2023112960307 filed with the China National Intellectual Property Administration on Oct. 9, 2023 and entitled "PICKING ROBOT, FRUIT POSITIONING METHOD AND APPARATUS THEREFOR, ELECTRONIC DEVICE, AND MEDIUM". Both of the aforementioned applications are hereby incorporated by reference in their entireties.

TECHNICAL FIELD

The present disclosure relates to the technical field of smart agriculture, and in particular, to a picking robot, a fruit positioning method and apparatus therefor, an electronic device, and a medium.

BACKGROUND

In a background of a shortage of agricultural labor, picking by a robot is an urgent need for the development of fruit and vegetable industry. Researchers have carried out a lot of research on fruit information obtaining methods and systems for picking robots, and have made positive progress.

Existing picking robot systems commonly use single vision sensors to recognize and position fruit by means of a deep learning technology, a traditional machine vision technology, and the like to guide operation of the picking robots. With continuous increase of operation tasks, the picking robots that integrate a plurality of robotic arms and end effectors have attracted more and more attention.

A multi-arm picking robot has a large number of mechanisms and a wide range of operation, and is prone to mutual interference between arms. Obtaining fruit distribution in advance is particularly crucial for controlling and planning, and has a significant impact on picking efficiency. However, existing multi-arm picking robots mainly adopt a solution of using a single vision sensor. The vision sensor is mounted at a distance from an operation surface. Due to long sensing distance, there is a significant deviation in fruit positioning, and the picking efficiency of the robot is not high.

SUMMARY

For disadvantages in a conventional art, an objective of the present disclosure is to provide a robot operation planning method and system, and an application therefor. A specific solution is as follows.

The present disclosure provides a picking robot, a fruit positioning method and apparatus therefor, an electronic device, and a medium to overcome deficiencies that a multi-arm picking robot in the conventional art has a significant deviation in fruit positioning, and the picking efficiency is not high.

The present disclosure provides a picking robot, including:

- a robot body, where the robot body includes a processor;
- a plurality of first image collection modules and one second image collection module are mounted on the robot body; and the robot body includes a plurality of robotic arms.

Each robotic arm has one corresponding first image collection module mounted nearby. Each first image collection module does not interfere with a corresponding robotic arm. The second image collection module is mounted at a position of a base of the robot body for determining base coordinate system.

The processor is configured to determine, based on fruit tree images of respective sub-areas in an operation area that are collected by respective first image collection modules and the base coordinate system, global fruit positioning distribution information of the operation area, and determine partial fruit positioning distribution information corresponding to each robotic arm according to the global fruit positioning distribution information to control the robotic arms to perform collaborative operation.

According to a picking robot provided in the present disclosure, the robot body includes a body main frame and a plurality of connecting rods mounted on the body main frame.

At least two robotic arms are mounted on each connecting rod. Each connecting rod has the first image collection modules, wherein each robotic arm corresponds to one first image collection module. Each first image collection module is located close to an end joint of the corresponding robotic arm.

According to a picking robot provided in the present disclosure, the robotic arm is a telescopic robotic arm. Each first image collection module is mounted on one side, close to a gripper, of a corresponding telescopic robotic arm. A central axis of a shooting visual angle of each first image collection module is consistent with a stretching and retracting direction of the corresponding telescopic robotic arm.

The present disclosure further provides a fruit positioning method applied to any one of the picking robots described above, including:

- obtaining the fruit tree images of the respective sub-areas in the operation area that are collected by respective first image collection modules, and inputting the fruit tree images into a predefined target detection model to obtain two-dimensional bounding box information and a mask area of each fruit in each fruit tree image output by the predefined target detection model;
- generating a three-dimensional point cloud of each fruit in each fruit tree image by using the mask area of each fruit in each fruit tree image and corresponding image depth information, and determining a first positioning coordinate point of each fruit in each fruit tree image based on the three-dimensional point cloud and the two-dimensional bounding box information of each fruit in each fruit tree image; and
- determining the global fruit positioning distribution information of the operation area based on a result obtained by transforming the first positioning coordinate point of each fruit in each fruit tree image to base coordinate system.

According to a fruit positioning method provided in the present disclosure, the determining a first positioning coordinate point of each fruit in each fruit tree image based on the three-dimensional point cloud and the two-dimensional bounding box information of each fruit in each fruit tree image includes:

- performing clustering calculation on the three-dimensional point cloud of each fruit in each fruit tree image by using a point cloud clustering algorithm to determine a surface feature point of each fruit in each fruit tree image;

generating a three-dimensional view frustum and a central line of the view frustum corresponding to each fruit in each fruit tree image according to the two-dimensional bounding box information of each fruit in each fruit tree image; and determining the first positioning coordinate point of each fruit in each fruit tree image based on the central line of the view frustum and the surface feature point corresponding to each fruit in each fruit tree image.

According to a fruit positioning method provided in the present disclosure, the determining the first positioning coordinate point of each fruit in each fruit tree image based on the central line of the view frustum and the surface feature point corresponding to each fruit in each fruit tree image includes:

constructing a sphere with the surface feature point as a center of the sphere and a target length as a radius for each fruit in each fruit tree image, where the target length is determined based on a depth value corresponding to the surface feature point;

determining two intersection points where the central line of the view frustum corresponding to each fruit in each fruit tree image penetrates through a corresponding sphere thereof; and determining one of the two intersection points for each fruit in each fruit tree image, which has a greater distance from a shooting focus as the first positioning coordinate point of each fruit in each fruit tree image.

According to a fruit positioning method provided in the present disclosure, the determining the global fruit positioning distribution information of the operation area based on a result obtained by transforming the first positioning coordinate point of each fruit in each fruit tree image to the base coordinate system includes:

transforming the first positioning coordinate point of each fruit in each fruit tree image to the base coordinate system to obtain a second positioning coordinate point of each fruit in each fruit tree image in the base coordinate system;

determining a positioning coordinate point pair of adjacent fruits according to the second positioning coordinate point of each fruit in the base coordinate system, and determining a distance between two second positioning coordinate points in each positioning coordinate point pair in the base coordinate system;

determining those of positioning coordinate point pairs that have a distance less than a target threshold value as target positioning coordinate point pairs, and eliminating one of the second positioning coordinate points from each target positioning coordinate point pair; and generating the global fruit positioning distribution information of the operation area according to the second positioning coordinate points reserved in the base coordinate system.

The present disclosure further provides a fruit positioning apparatus, including:

an output module, configured to obtain fruit tree images of respective sub-areas in an operation area that are collected by respective first image collection modules, and input the fruit tree images into a predefined target detection model to obtain two-dimensional bounding box information and a mask area of each fruit in each fruit tree image output by the predefined target detection model;

a positioning module, configured to generate a three-dimensional point cloud of each fruit in each fruit tree image by using the mask area of each fruit in each fruit tree image and corresponding image depth information, and determine a first positioning coordinate point of each fruit in each fruit tree image based on the three-dimensional point cloud and the two-dimensional bounding box information of each fruit in each fruit tree image; and a processing module, configured to determine global fruit positioning distribution information of the operation area based on a result obtained by transforming the first positioning coordinate point of each fruit in each fruit tree image to base coordinate system.

The present disclosure further provides an electronic device, including a memory, a processor, and a computer program stored in the memory and capable of running on the processor. Any one of the fruit positioning methods described above is implemented when the processor executes the program.

The present disclosure further provides a non-transitory computer-readable storage medium having a computer program stored therein. Any one of the fruit positioning methods described above is implemented when the computer program is executed by a processor.

The present disclosure further provides a computer program product, including a computer program. Any one of the fruit positioning methods described above is implemented when the computer program is executed by a processor.

According to the picking robot, the fruit positioning method and apparatus therefor, the electronic device, and the medium provided in the present disclosure, a plurality of image collection modules are provided on a body of a multi-arm picking robot to perform multi-visual angle image collection. A processor uniformly transforms images collected from various visual angles to base coordinates of the robot, synchronously obtains visual information of all picking targets in an operation area, and generates global fruit positioning distribution information that matches dimensions of an operation space range of the robot, which facilitates efficient collaborative operation of various robotic arms, can achieve accurate fruit detection at a close distance in the operation area, obtain fruit information in a wide range, and improve the accuracy and range of fruit positioning, and is conductive to greatly improving the fruit picking efficiency of the robot.

BRIEF DESCRIPTION OF THE DRAWINGS

To describe technical solutions in embodiments of the present disclosure or in a conventional art more clearly, the following briefly describes the drawings required for describing the embodiments. Apparently, the drawings in the following description are merely some embodiments of the present disclosure. For those of ordinary skill in the art, other drawings may be obtained according to these drawings without creative efforts.

DETAILED DESCRIPTION OF THE EMBODIMENTS

To make objectives, technical solutions, and advantages of embodiments of the present disclosure clearer, the following clearly and completely describes the technical solutions in the embodiments of the present disclosure with reference to the drawings in the embodiments of the present disclosure. Apparently, the described embodiments are part rather than all of the embodiments of the present disclosure. Based on the embodiments of the present disclosure, all other embodiments obtained by those of ordinary skill in the art without creative work fall within the scope of protection of the present disclosure.

In the descriptions of the present disclosure, it is to be noted that, unless otherwise specified and limited explicitly, terms “mounted”, “interconnected”, and “connected” are to be interpreted broadly, for example, may be fixedly connected, or detachably connected, or integrally connected; may be mechanically connected, or electrically connected; may be directly interconnected, or indirectly connected through an intermediate medium, or may be internally communicated between two elements. For those of ordinary skill in the art, specific meanings of the terms described above in the present disclosure may be understood according to specific conditions.

A picking robot, a fruit positioning method and apparatus therefor, an electronic device, and a medium of the present disclosure are described below with reference to FIG. 1 to FIG. 6.

Figure 1:
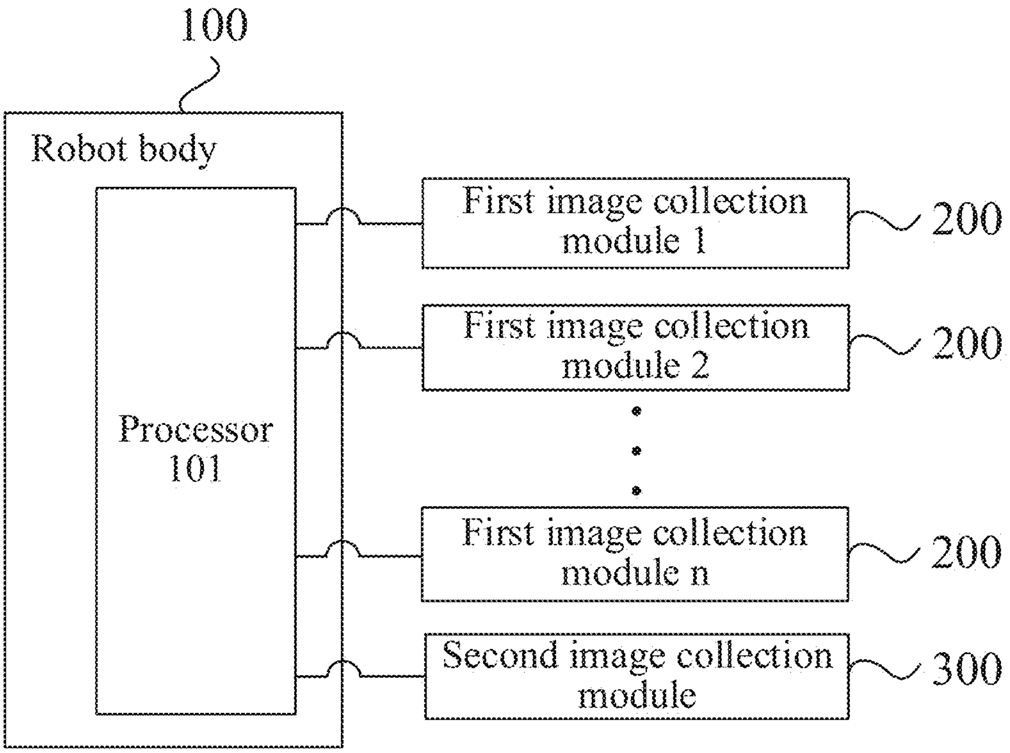
FIG. 1 is a first schematic structural diagram of a picking robot according to the present disclosure.

FIG. 1 is a first schematic structural diagram of a picking robot according to the present disclosure. As shown in FIG. 1, the picking robot may include a robot body 100.

The robot body 100 includes a processor 101, and has a plurality of first image collection modules 200, including a first image collection module 1, a first image collection module 2, . . . , and a first image collection module n, and a second image collection module 300 mounted thereon. The robot body includes a plurality of robotic arms, and n represents a number of the first image collection modules 200, and n is greater than 1.

Each robotic arm has one corresponding first image collection module 200 mounted nearby. Each first image collection module 200 does not interfere with the corresponding robotic arm. The second image collection module 300 is mounted at a position of a base of the robot body 1 for determining base coordinate system.

The processor 101 is configured to determine, based on fruit tree images of respective sub-areas in an operation area that are collected by respective first image collection modules 200 and the base coordinate system, global fruit positioning distribution information of the operation area, and determine partial fruit positioning distribution information corresponding to each robotic arm according to the global fruit positioning distribution information to control various robotic arms to perform collaborative operation.

Specifically, in the embodiments of the present disclosure, the image collection modules may specifically use color depth cameras based on different ranging principles, for example, various types of color depth cameras (which may also be referred to as stereo vision cameras) based on a structured light technology, a binocular stereo vision matching technology, or flight time, and are configured to obtain a fruit tree image in the operation area. The fruit tree image may include a color image and a depth image of an operation surface of a fruit tree.

The first image collection module described in the embodiments of the present disclosure refers to an image collection module configured to collect a fruit tree image of each sub-area in a fruit tree picking operation area.

The second image collection module described in the embodiments of the present disclosure refers to an image collection module configured to determine the base coordinate system of the robot, and assist in calibrating the first image collection modules.

It is to be noted that the base coordinate system are also referred to as robot coordinates, which are virtual Cartesian Coordinates that take a robot mounting base as a benchmark and are used for describing movement of the robot body.

The global fruit positioning distribution information described in the embodiments of the present disclosure refers to a fruit positioning distribution condition at a global scale, in an overall picking operation area fused and covered by a shooting range of all first image collection modules.

The local fruit positioning distribution information described in the embodiments of the present disclosure refers to a fruit positioning distribution condition corresponding to a sub-area where each robotic arm takes charge of picking, determined after the global fruit positioning distribution information of the overall operation area is segmented.

In the embodiments of the present disclosure, a plurality of first image collection modules and one second image collection module are mounted on a robot body. Each robotic arm has one corresponding first image collection module mounted nearby. Each first image collection module may assist a corresponding robotic arm in performing fruit picking operation.

A mounting angle of each first image collection module may be flexibly adjusted according to a specific actual operation condition. An adjustment principle is to ensure that each first image collection module does not interfere with a robotic arm body and a line of sight of each first image collection module is not blocked by the robotic arm body.

Figure 2:
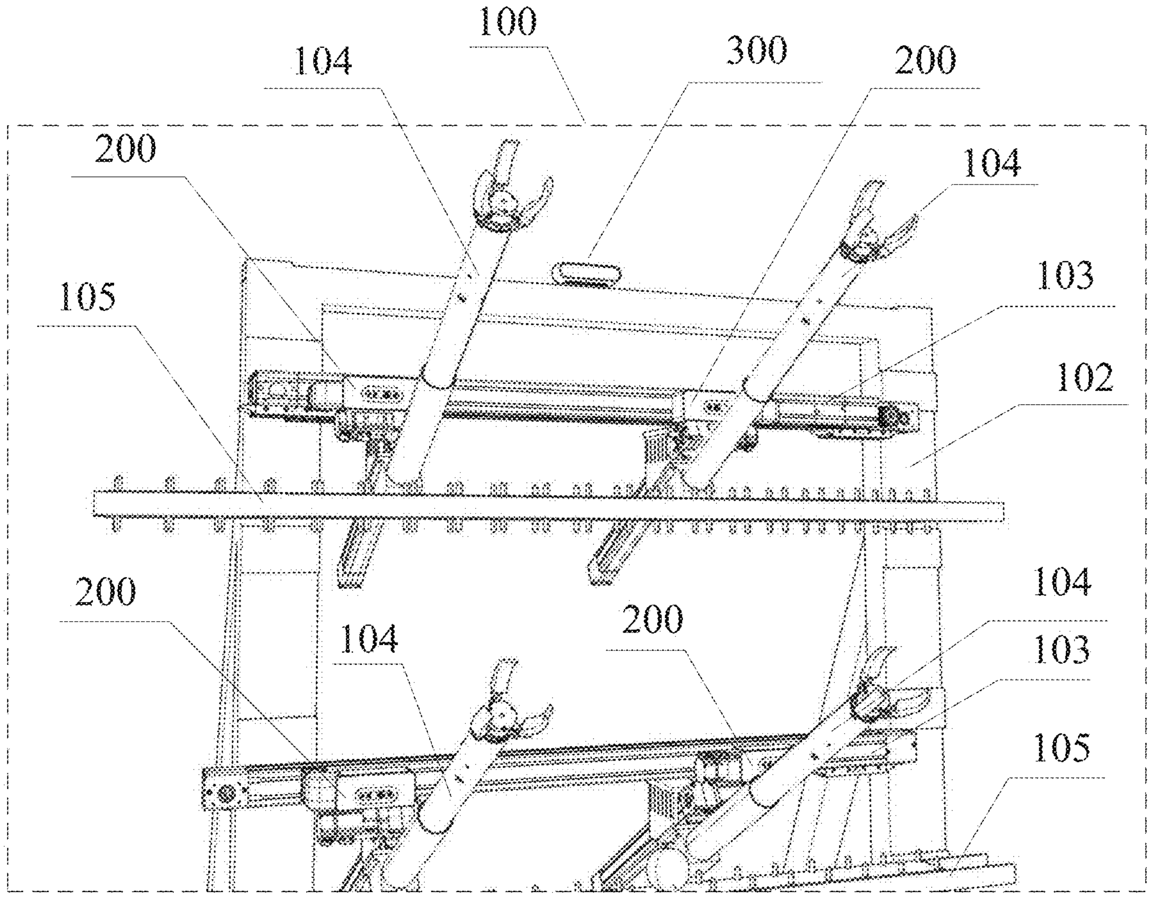
FIG. 2 is a second schematic structural diagram of the picking robot according to the present disclosure.

FIG. 2 is a second schematic structural diagram of the picking robot according to the present disclosure. As shown in FIG. 2, the robot body 100 further includes a body main frame 102 and a plurality of connecting rods 103 mounted on the body main frame 102 in layers.

At least two robotic arms 104 are mounted on each connecting rod 103. Each connecting rod 103 has respective first image collection modules 200 corresponding to respective robotic arms 104, mounted thereon. Each first image collection module 200 is located close to an end joint of the corresponding robotic arm 104.

Optionally, a fruit collection conveyor belt 105 may also be mounted on the body main frame 102, and is configured to collect fruits picked by the robotic arms 104. According to actual operation needs, the first image collection module 200 may also be mounted at a position, close to the end joint of the robotic arm 104, on a side surface of the fruit collection conveyor belt 105.

It may be understood that the robot body may further include a mobile platform. A bottom of the body main frame is fixedly connected to the mobile platform, for example, by bolts, for flexibly moving the robot to a position in the operation area.

Specifically, in the embodiments of the present disclosure, the body main frame of the picking robot body may use a door frame structure, on which a plurality of connecting rods are provided to enable mounting and fixedly connecting of a robotic arm drive mechanism and the plurality of image collection modules.

At least two robotic arms are mounted on each connecting rod. That is to say, adaptive adjustment may be performed according to an actual dimension of a fruit tree. For a wide-range operation area, more than two robotic arms may also be mounted on each connecting rod. No specific limits are made thereto in the present disclosure.

On each connecting rod, respective first image collection modules are mounted close to the end joints of respective robotic arm.

It is to be noted that, in the embodiments of the present disclosure, the robotic arm may be a Cartesian robotic arm. Each first image collection module may also be mounted on other apparatuses close to the end joint of the robot, and a direction of a line of sight of image collection and a stretching and retracting direction of a telescopic arm form a certain angle.

Figure 3:
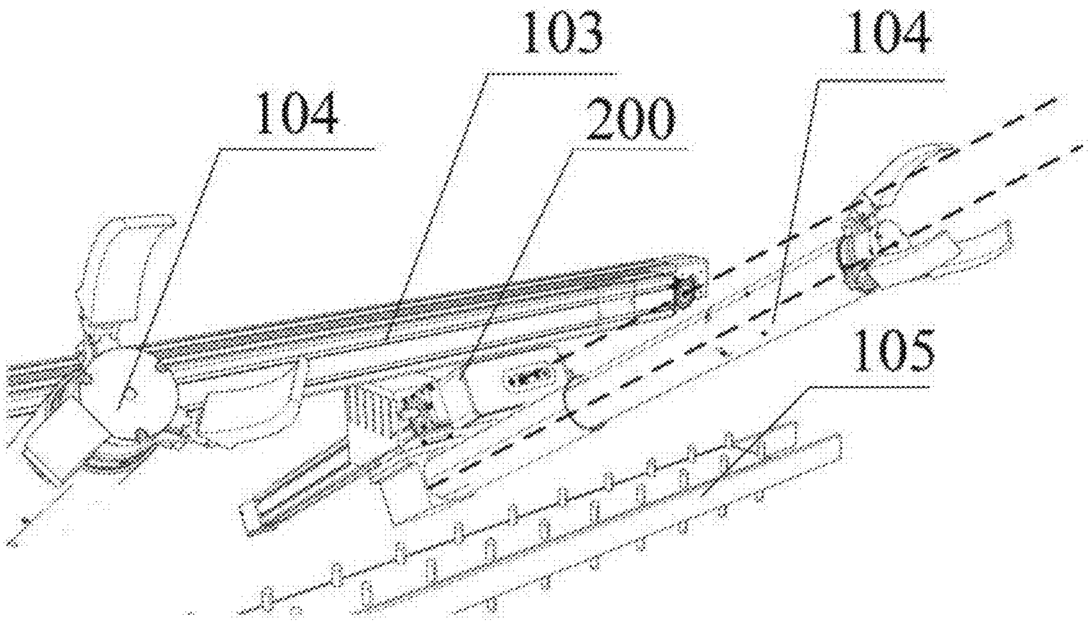
FIG. 3 is a third schematic structural diagram of the picking robot according to the present disclosure.

FIG. 3 is a third schematic structural diagram of the picking robot according to the present disclosure. As shown in FIG. 3, the robotic arm 104 may be a telescopic robotic arm. Each first image collection module 200 is mounted on one side, close to a gripper, of the corresponding telescopic robotic arm 104. A central axis of a shooting visual angle of each first image collection module 200 is consistent with a stretching and retracting direction of the corresponding telescopic robotic arm.

The picking robot of the embodiments of the present disclosure uses the telescopic robotic arm and is mounted based on that the central axis of the shooting visual angle of the first image collection module is consistent with the stretching and retracting direction of the telescopic robotic arm, which can effectively reduce an impact on the image collection module during an operation of the robotic arm, facilitates picking fruit timely by the robotic arm without adjusting a picking angle, and is conductive to improving the picking efficiency.

Continuing to refer to FIG. 2, in the embodiments of the present disclosure, the second image collection module may be mounted at a position of a base on the body main frame, and is configured to determine the base coordinate system of the robot and calibrate each first image collection module.

The picking robot of the embodiments of the present disclosure is manufactured by using a main frame structure, which is simple in the structure, convenient in mounting of the image collection modules and robotic arms, and requires less materials, and thus the manufacturing cost can be reduced, achieving energy conservation and emission reduction.

In the embodiments of the present disclosure, the second image collection module is mounted at the position of the base of the robot body. The base coordinate system may be determined by measuring a pose matrix of the second image collection module. Therefore, through the second image collection module, coordinates of an image of each first image collection module may be calibrated to transform the image from each first image collection module to uniform base coordinate system, so as to facilitate performing fusion processing on each image and obtaining global fruit distribution information of the operation area.

In the embodiments of the present disclosure, each image collection module is electrically connected to a processor. The processor may obtain fruit tree images of respective sub-areas in an operation area that are collected by respective first image collection modules, obtain the base coordinate system, and calibrate coordinates of the fruit tree images collected by the first image collection modules, and uniformly transform each fruit tree image to the base coordinate system for representing.

More specifically, in the embodiments of the present disclosure, a specific method for calibrating the plurality of first image collection modules includes the following steps:

Firstly, the fruit tree images collected by the plurality of first image collection modules (such as stereo vision cameras) are observed. One or several groups of observation positions that can cover a wide range of a view field are selected by controlling positions of the plurality of robotic arms and adjusting observation positions of the plurality of first image collection modules on a fruit tree, so as to ensure that all fruits in operation space are located in respective ranges of the view field and avoid the appearance of a vision blind area. Secondly, one second image collection module D1 is mounted at a base fixing position of the robot, as shown in FIG. 2, and a pose matrix $$T_B^D$$

of the second image collection module mounted at the fixing position and the base coordinate system of the robot is manually measured.

Then, a calibration board is placed in the range of the view field of all first image collection modules, Red-Green-Blue (RGB) color images of the calibration board shot by all first image collection modules are obtained, and external pose parameter calibration algorithms of the cameras are run, relative pose relationships $$T_{board}^{A1} \text{ to } T_{board}^{An}$$

between each first image collection module and the calibration board may be obtained, and pose relationships $$T_D^{A1} \text{ to } T_D^{An}$$

between each first image collection module and the second image collection module is further solved.

Finally, in combination with a pose relationship $$T_D^{board}$$

between the second image collection module and the calibration board, a pose transformation matrix $$T_B^{An}$$

between the first image collection module systems A1 to An and the base coordinate system may be obtained through the following formula, that is:

$$T_B^{An} = T_{board}^{An} \cdot T_D^{board} \cdot T_B^D.$$

Where, An represents coordinate system of the nth first image collection module, D represents coordinate system of the second image collection module, B represents the base coordinate system, and board represents coordinate system of the calibration board.

Further, in the embodiments of the present disclosure, the processor may perform, based on the obtained fruit tree images of the respective sub-areas in corresponding visual angles in the operation area that are collected by respective first image collection modules and the base coordinate system, point cloud projection by using depth information of each fruit in the color image and the depth image, so as to obtain visual information of all picking targets in the base coordinate system, in the operation area, through the above calibration relationships, and determine the global fruit positioning distribution information of the operation area by calculating a positioning center point of each picking target, thereby determining local fruit positioning distribution information in the sub-area corresponding to each robotic arm according to the global fruit positioning distribution information, and controlling various robotic arms to perform collaborative operation to pick fruits in the operation area.

In the embodiments of the present disclosure, a plurality of cameras performs image collection at set positions, so that the visual information of all picking targets in the operation area may be synchronously obtained. All fruit coordinates are obtained through target positioning and coordinate transformation, which improves operation planning performance. Compared with long-distance observation of a single camera, mounting is easier to implement, and close observation is helpful to improve the measurement accuracy. Meanwhile, compared with a solution that a single camera continuously moves to obtain global information of fruits, the solution of the embodiments of the present disclosure can synchronously obtain global distribution information of all fruits in the operation area without repeatedly moving the camera, which is more timely. In addition, detection results of a plurality of vision units in the embodiments of the present disclosure can achieve an effect of mutual verification. Therefore, occurrence of false detection can be effectively reduced.

In some embodiments, after each first image collection module completes image collection, each first image collection module may transmit collected fruit images, by means of communication manners such as wired connection, Wireless Fidelity (WIFI) or a 4th Generation Mobile Communication Technology (4G)/a 5th Generation Mobile Communication Technology (5G), to an image processing module with a built-in processor, such as a graphic edge computing chip, a graphic workstation, and a graphic server, which completes recognition and positioning of a fruit target through a series of algorithms such as machine learning-based image recognition, detection, and segmentation. Due to the plurality of image collection modules, instead of a single computer for which control planning and graphic reasoning work are hard to be synchronously completed, a plurality of graphic reasoning apparatuses need to be configured to form a distributed solution.

Optionally, in this embodiment, if four stereo vision cameras are configured to perform image collection, one to four independent graphic processing computers may be configured to share graphic calculating pressure according to a requirement of a system on real time performance. For allocation of graphic computing resources, the balance between a Graphics Processing Unit (GPU) and a Central Processing Unit (CPU) is considered, so as to improve the graphic calculating efficiency of a plurality of sources. The following solutions may be adopted:

(1) One independent graphic computing unit is configured to process the image information collected by two stereo vision cameras, and one main control computer is configured to process the image information collected by the other two stereo vision cameras.

(2) Two independent graphic computing units are configured to separately process the image information collected by one stereo vision camera, and one main control computer s configured to process the image information collected by two stereo vision cameras.

(3) One main control computer is configured to process the image information collected by four stereo vision cameras.

The centralized solutions described above may achieve different application effects, and in specific applications, the solution can be determined by taking into consideration of performance and cost.

In this embodiment, tasks are allocated to a plurality of edge computing platforms by flexibly allocating the graphic computing resources without relying on single computer graphic processing, which reduces the pressure of a main control system, and is conductive to reducing hardware cost.

According to the picking robot of the embodiments of the present disclosure, a plurality of image collection modules are provided on a body of a multi-arm picking robot to perform multi-visual angle image collection. A processor uniformly transforms images collected from various visual angles to base coordinate system of the robot, synchronously obtains visual information of all picking targets in an operation area, and generates global fruit positioning distribution information that matches dimensions of an operation space range of the robot, which facilitates efficient collaborative operation of various robotic arms, can achieve accurate fruit detection at a close distance in the operation area, obtain fruit information in a wide range, and improve the accuracy and range of fruit positioning, and in turn is conductive to greatly improving the fruit picking efficiency of the robot.

Figure 4:
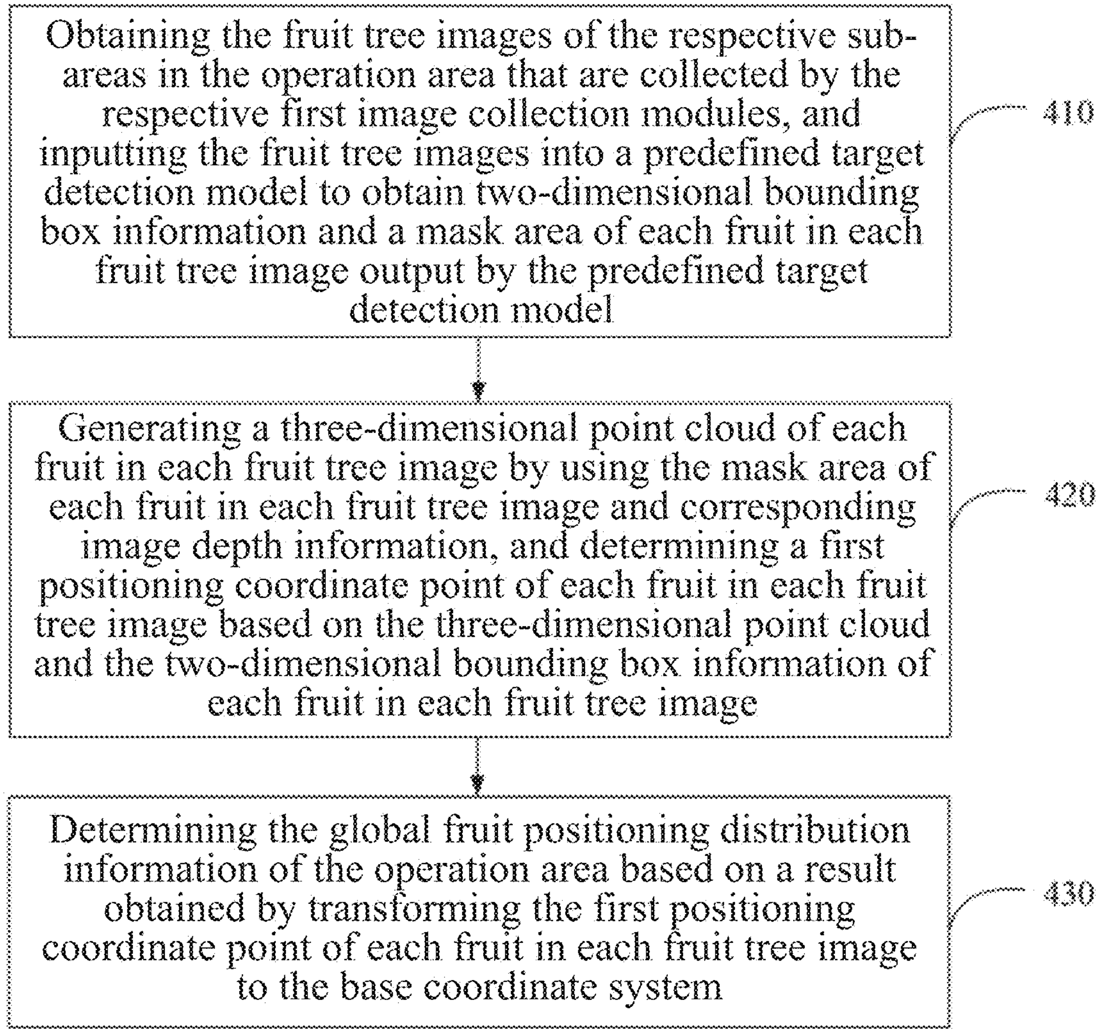
FIG. 4 is a flowchart of a fruit positioning method according to the present disclosure.

FIG. 4 is a flowchart of a fruit positioning method according to the present disclosure. As shown in FIG. 4, it may be understood that the method may be applied to any one of the picking robots described above, and an execution body of the method is a processor in the picking robot. The method includes Step 410, Step 420, and Step 430.

In Step 410, the fruit tree images of respective sub-areas in an operation area that are collected by respective first image collection modules are obtained, and the fruit tree images are input into a predefined target detection model to obtain two-dimensional bounding box information and a mask area of each fruit in each fruit tree image output by the predefined target detection model.

In Step 420, a three-dimensional point cloud of each fruit in each fruit tree image is generated by using the mask area of each fruit in each fruit tree image and corresponding image depth information, and a positioning coordinate point of each fruit in each fruit tree image is determined based on the three-dimensional point cloud and the two-dimensional bounding box information of each fruit in each fruit tree image.

In Step 430, global fruit positioning distribution information of the operation area is determined based on a result obtained by transforming the positioning coordinate point of each fruit in each fruit tree image to base coordinate system.

Specifically, the two-dimensional bounding box information described in the embodiments of the present disclosure refers to information, of a two-dimensional box that completely surrounds a fruit target, output by performing target detection on each fruit in each fruit tree image by using a target detection algorithm.

It is to be noted that the predefined target detection model may be constructed based on a deep convolutional neural network model, for example, a YOLOv4 network model, which includes one shared encoding network and two decoding networks that undertake different tasks. The encoding network consists of a backbone network (Backbone) responsible for feature extraction and a neck network (Neck) responsible for collecting feature maps in different stages. One decoding network consists of a target detection head network (Detect Head) configured to predict a fruit occlusion type and a complete two-dimensional bounding box, and the other decoding network consists of an example segmentation head network (Segment Head) configured to segment a pixel mask of a visible part of a fruit.

In the embodiments of the present disclosure, after the multi-arm picking robot moves to an operation site, a main control system of the robot transmits a start instruction to control a multi-arm mechanism to reach a set observation position. After the multi-arm mechanism reaches the observation position, in Step 410, all first image collection modules simultaneously collect fruit tree images in corresponding sub-areas in the operation area, including color images and depth images of an operation surface of a fruit tree, and transmit the fruit tree images to a processor for image processing. After obtaining the fruit tree images collected by the first image collection modules, the processor first inputs the collected fruit tree images into a predefined target detection model, and the predefined target detection model performs image segmentation on fruit targets in the color images of the fruit tree images to obtain the mask area and the two-dimensional bounding box information of each fruit.

Further, in the embodiments of the present disclosure, in Step 420, a depth value of a mask pixel area of each fruit is determined by using image depth information of each fruit in the depth image of each fruit tree image, and a three-dimensional point cloud of the mask area is calculated and generated in combination with known internal imaging model parameters of the cameras to obtain a three-dimensional point cloud of each fruit in each fruit tree image. Meanwhile, a centroid position of each fruit in each fruit tree image is estimated by calculating a spatial geometric positional relationship between the three-dimensional point cloud of each fruit in each fruit tree image and the two-dimensional bounding box information in combination with the two-dimensional bounding box information of each fruit output by the foregoing target detection model, thereby obtaining positioning coordinate point of each fruit in each fruit tree image.

Further, in the embodiments of the present disclosure, in Step 430, positioning coordinate points of all fruits in the operation area in the base coordinate system are obtained by transforming the positioning coordinate point of each fruit in each fruit tree image into the base coordinate system. Based on this transformation result, a fruit positioning result in an overlapping and interlacing view field is processed in the base coordinate system, and the same fruit target in a plurality of visual collection view fields is eliminated, so as to avoid repetition of a planning process, and finally generate the global fruit positioning distribution information of the operation area.

According to the fruit positioning method for the picking robot in the embodiments of the present disclosure, a plurality of image collection modules are provided on a body of a multi-arm picking robot to perform multi-visual angle image collection, the images collected from various visual angle are uniformly transformed to the base coordinate system of the robot, visual information of all picking targets in the operation area are synchronously obtained, and the global fruit positioning distribution information that matches dimensions of an operation space range of the robot is generated, which ensures efficient collaborative operation of various robotic arms, can achieve accurate fruit detection at a close distance in the operation area, obtain fruit information in a wide range, and improve the accuracy and range of fruit positioning, and greatly improves the fruit picking efficiency of the robot.

Based on the content of the embodiments described above, as an optional embodiment, the step that the positioning coordinate point of each fruit in each fruit tree image is determined based on the three-dimensional point cloud and the two-dimensional bounding box information of each fruit in each fruit tree image includes the following steps.

Clustering calculation is performed on the three-dimensional point cloud of each fruit in each fruit tree image by using a point cloud clustering algorithm to determine a surface feature point of each fruit in each fruit tree image.

A three-dimensional view frustum and a central line of the view frustum corresponding to each fruit in each fruit tree image are generated according to the two-dimensional bounding box information of each fruit in each fruit tree image.

The positioning coordinate point of each fruit in each fruit tree image is determined based on the central line of the view frustum and the surface feature point corresponding to each fruit in each fruit tree image.

Specifically, the surface feature point described in the embodiments of the present disclosure refers to a point for describing a surface feature of a fruit.

In the embodiments of the present disclosure, after obtaining three-dimensional point cloud information of each fruit in each fruit tree image, clustering calculation is performed on the three-dimensional point cloud of each fruit by using point cloud clustering and filtering methods to solve a centroid of the point cloud, that is, to obtain the surface feature point of each fruit in each fruit tree image.

Further, in the embodiments of the present disclosure, a three-dimensional view frustum on an optical path from a shooting focus to a two-dimensional bounding box of the fruit and a central line of the view frustum that penetrates through the two-dimensional bounding box are further generated by using a principle of geometrical optics and combining the shooting focus of the image, according to the two-dimensional bounding box information of each fruit in each fruit tree image.

Further, in the embodiments of the present disclosure, the positioning coordinate point of each fruit in each fruit tree image is calculated based on a spatial geometric relationship between the central line of the view frustum and the surface feature point corresponding to each fruit in each fruit tree image.

According to the method of the embodiments of the present disclosure, by using image point cloud clustering calculation and combining an optical view frustum, through a method of estimating a position of the surface feature point of the fruit, a centroid of each fruit is calculated and reasoned from a geometric imaging principle level to achieve recognition and positioning of each fruit, which has good performance on a common scenario in which a fruit is sheltered in an orchard, can significantly reduce the impact of foreign object occlusion on fruit positioning, and improves the accuracy of estimating the position of the centroid of the fruit by the algorithm.

Based on the content of the embodiments described above, as an optional embodiment, the step that the positioning coordinate point of each fruit in each fruit tree image is determined based on the central line of the view frustum and the surface feature point corresponding to each fruit in each fruit tree image includes the following steps.

A sphere with the surface feature point as a center of the sphere and a target length as a radius is constructed for each fruit in each fruit tree image. The target length is determined based on a depth value corresponding to the surface feature point.

Two intersection points where the central line of the view frustum corresponding to each fruit in each fruit tree image penetrates through the corresponding sphere thereof are determined.

One of the two intersection points corresponding to each fruit in each fruit tree image, which has a greater distance from a shooting focus is determined as a positioning coordinate point of each fruit in each fruit tree image.

Specifically, in the embodiments of the present disclosure, the sphere with the surface feature point $P_s$ as the center of the sphere and the target length as the radius is determined for each fruit in each fruit tree image. Where, the target length may be calculated through the following formula, that is:

$$r = \frac{K_u \Delta u}{2z'}.$$

Where, Au represents an edge length of a complete fruit two-dimensional bounding box on a U axis of the image plane, z' represents the depth value corresponding to the surface feature point, $K_u$ represents a scaling factor of the camera on the U axis, and r is the target length, that is, a radius of the fruit.

After that, after r is determined, the sphere with the surface feature point $P_s$ as the center of the sphere and r as the radius may be constructed. Two intersection points where the central line of the view frustum corresponding to each fruit in each fruit tree image penetrates through the corresponding sphere thereof are solved.

Finally, one of the two intersection points corresponding to each fruit in each fruit tree image, which has a greater distance from a shooting focus is determined as a centroid $P_o$ of a fruit sphere, that is, the positioning coordinate point of each fruit in each fruit tree image is obtained.

According to the method of the embodiments of the present disclosure, the centroid of the fruit sphere is solved according to the surface feature point of the fruit by considering a relationship between the surface feature point of the fruit and the centroid of the fruit sphere in geometric space, which can improve the accuracy of estimating the position of the centroid of the fruit, and improve the accuracy of positioning and recognizing the fruit.

Based on the content of the embodiments described above, as an optional embodiment, the step that the global fruit positioning distribution information of the operation area is determined based on a result obtained by transforming the positioning coordinate point of each fruit in each fruit tree image to the base coordinate system includes the following steps.

The positioning coordinate point of each fruit in each fruit tree image is transformed to the base coordinate system to obtain the positioning coordinate point of each fruit in each fruit tree image in the base coordinate system.

A positioning coordinate point pair of adjacent fruits is determined according to the positioning coordinate point of each fruit in the base coordinate system, and a distance between two the positioning coordinate points in each positioning coordinate point pair in the base coordinate system is determined.

Those of the positioning coordinate point pairs that have a distance less than a target threshold value are determined as target positioning coordinate point pairs, and one of the positioning coordinate points is eliminated from each target positioning coordinate point pair.

The global fruit positioning distribution information of the operation area is generated according to the positioning coordinate points reserved in the base coordinate system.

Specifically, the positioning coordinate point pair described in the embodiments of the present disclosure refers to a point pair formed by two adjacent positioning coordinate points of all fruit positioning coordinate points in the same base coordinate system.

The target threshold value described in the embodiments of the present disclosure refers to a distance threshold value set in advance. The target threshold value may be used for determining whether the two adjacent positioning coordinate points are the same repeated positioning coordinate point. The selection of the threshold value may be flexibly adjusted according to actual conditions.

Further, in the embodiments of the present disclosure, after obtaining the three-dimensional positioning coordinate point $P_o$ of each fruit in the operation area in different shooting view fields, the positioning coordinate point of each fruit in each fruit tree image is transformed to unified base coordinate system through the foregoing determined external pose parameter information $$T_B^{An}$$

of the camera, so as to obtain the positioning coordinate point $$P_o'$$

of each fruit in the operation area in the base coordinate system.

To eliminate repeated positioning information of the same fruit target under different image collection modules, positioning coordinate positions of all fruits are screened after transformation.

Specifically, the positioning coordinate point pairs of all adjacent fruits are obtained according to the positioning coordinate point of each fruit in the base coordinate system, and a distance between two positioning coordinate points in the positioning coordinate point pair in the base coordinate system is determined. The positioning coordinate points of the fruits that are too close in distance are determined, a target threshold value $D_{th}$ is set, the positioning coordinate point pair with a distance less than the target threshold value $D_{th}$ is determined as a target positioning coordinate point pair, and a repeated target is eliminated from a target positioning coordinate point pair, that is, one positioning coordinate point is eliminated from the target positioning coordinate point part, thereby generating the global fruit positioning distribution information of the operation area according to the positioning coordinate points reserved in the base coordinate system, obtaining complete fruit coordinate distribution in the operation area, and completing accurate positioning of all fruits in a wide-range picking operation area.

According to the method of the embodiments of the present disclosure, the positioning coordinate point of each fruit in each fruit tree image is transformed to the base coordinate system, the repeated target in the overlapping and interlacing view field is processed, and the same fruit target in different collection view fields is eliminated, which avoids repetition in a subsequent operation planning process, improves the accuracy of the robot for global positioning results of all fruits in the picking operation area, and is conductive to improving the picking efficiency of the multi-arm robot.

The fruit positioning apparatus provided by the present disclosure is described below. The fruit positioning apparatus described hereinafter and the fruit positioning method described hereinbefore may refer to each other correspondingly.

Figure 5:
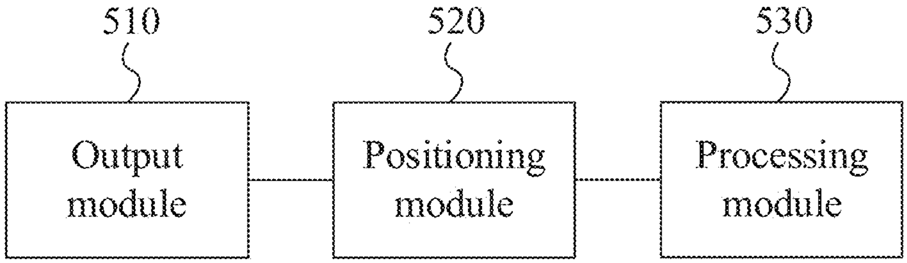
FIG. 5 is a schematic structural diagram of a fruit positioning apparatus according to the present disclosure.

FIG. 5 is a schematic structural diagram of the fruit positioning apparatus according to the present disclosure. As shown in FIG. 5, the apparatus may be applied to any one of the picking robots described above. The apparatus includes an output module 510, a positioning module 520, and a processing module 530.

The output module 510 is configured to obtain fruit tree images of respective sub-areas in an operation area that are collected by respective first image collection modules, and input the fruit tree images into a predefined target detection model to obtain two-dimensional bounding box information and a mask area of each fruit in each fruit tree image output by the predefined target detection model.

The positioning module 520 is configured to generate a three-dimensional point cloud of each fruit in each fruit tree image by using the mask area of each fruit in each fruit tree image and corresponding image depth information, and determine a positioning coordinate point of each fruit in each fruit tree image based on the three-dimensional point cloud and the two-dimensional bounding box information of each fruit in each fruit tree image.

The processing module 530 is configured to determine global fruit positioning distribution information of the operation area based on a result obtained by transforming the positioning coordinate point of each fruit in each fruit tree image to base coordinate system.

The fruit positioning apparatus described in this embodiment may be configured to perform the embodiments of the fruit positioning method described above. Principles and technical effects of the apparatus and the method are similar, which will not be repeated herein.

According to the fruit positioning apparatus for the picking robot in the embodiments of the present disclosure, a plurality of image collection modules are provided on a body of a multi-arm picking robot to perform multi-visual angle image collection, the images collected from various visual angles are uniformly transformed to the base coordinate system of the robot, visual information of all picking targets in the operation area are synchronously obtained, and the global fruit positioning distribution information that matches dimensions of an operation space range of the robot is generated, which ensures efficient collaborative operation of various robotic arms, can achieve accurate fruit detection at a close distance in the operation area, obtain fruit information in a wide range, and improve the accuracy and range of fruit positioning, and greatly improves the fruit picking efficiency of the robot.

Figure 6:
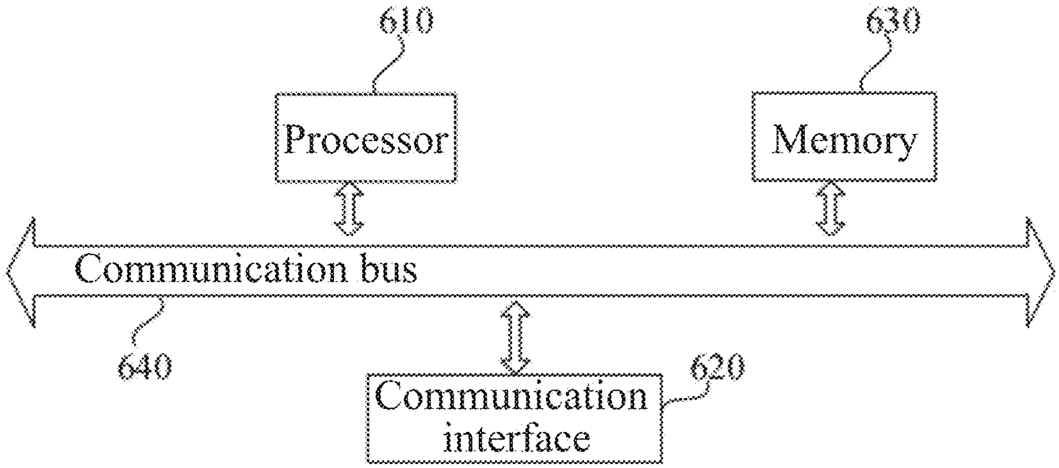
FIG. 6 is a schematic structural diagram of an entity of an electronic device according to the present disclosure.

FIG. 6 is a schematic structural diagram of an entity of an electronic device provided by the present disclosure. As shown in FIG. 6, the electronic device may include: a processor 610, a communication interface 620, a memory 630, and a communication bus 640. The processor 610, the communication interface 620, and the memory 630 complete communication with each other through the communication bus 640. The processor 610 may call logical instructions in the memory 630 to perform the fruit positioning method provided in various methods described above. The method includes the following steps, in which fruit tree images of respective sub-areas in an operation area that are collected by respective first image collection modules are obtained, and the fruit tree images are input into a predefined target detection model to obtain two-dimensional bounding box information and a mask area of each fruit in each fruit tree image output by the predefined target detection model; a three-dimensional point cloud of each fruit in each fruit tree image is generated by using the mask area of each fruit in each fruit tree image and corresponding image depth information, and a positioning coordinate point of each fruit in each fruit tree image is determined based on the three-dimensional point cloud and the two-dimensional bounding box information of each fruit in each fruit tree image; and global fruit positioning distribution information of the operation area is determined based on a result obtained by transforming the positioning coordinate point of each fruit in each fruit tree image to base coordinate system.

In addition, the logic instructions in the memory 630 described above may be stored in one computer-readable storage medium when implemented in the form of a software functional unit and sold or used as a standalone product. Based on such understanding, the technical solution of the present disclosure or a part that contributes to a conventional art or a part of the technical solution may be manifested in the form of a software product. The computer software product is stored in one storage medium and includes several instructions to enable one computer device (which may be a personal computer, a server, a network device, or the like) to perform all or part of steps of the methods described in the various embodiments of the present disclosure. The foregoing storage medium includes: various media that may store program codes, such as a USB Flash Drive, a mobile hard disc drive, a Read-Only Memory (ROM), a Random Access Memory (RAM), a magnetic disc, or an optical disc.

In another aspect, the present disclosure further provides a computer program product. The computer program product includes a computer program. The computer program may be stored on a non-transitory computer-readable storage medium. When the computer program is executed by a processor, a computer can perform the fruit positioning method provided in various methods described above. The method includes the following steps, in which fruit tree images of respective sub-areas in an operation area that are collected by respective first image collection modules are obtained, and the fruit tree images are input into a predefined target detection model to obtain two-dimensional bounding box information and a mask area of each fruit in each fruit tree image output by the predefined target detection model; a three-dimensional point cloud of each fruit in each fruit tree image is generated by using the mask area of each fruit in each fruit tree image and corresponding image depth information, and a positioning coordinate point of each fruit in each fruit tree image is determined based on the three-dimensional point cloud and the two-dimensional bounding box information of each fruit in each fruit tree image; and global fruit positioning distribution information of the operation area is determined based on a result obtained by transforming the positioning coordinate point of each fruit in each fruit tree image to base coordinate system.

In still another aspect, the present disclosure further provides a non-transitory computer-readable storage medium. The non-transitory computer-readable storage medium stores a computer program. The fruit positioning method provided in various methods described above is implemented when the computer program is executed by a processor. The method includes the following steps, in which fruit tree images of respective sub-areas in an operation area that are collected by respective first image collection modules are obtained, and the fruit tree images are input into a predefined target detection model to obtain two-dimensional bounding box information and a mask area of each fruit in each fruit tree image output by the predefined target detection model; a three-dimensional point cloud of each fruit in each fruit tree image is generated by using the mask area of each fruit in each fruit tree image and corresponding image depth information, and a positioning coordinate point of each fruit in each fruit tree image is determined based on the three-dimensional point cloud and the two-dimensional bounding box information of each fruit in each fruit tree image; and global fruit positioning distribution information of the operation area is determined based on a result obtained by transforming the positioning coordinate point of each fruit in each fruit tree image to base coordinate system.

The apparatus embodiments described above are merely illustrative. The units described as separate components may or may not be physically separated, and the components displayed as units may or may not be physical units, that is, may be located in one place or distributed to a plurality of network units. Part or all of the modules may be selected according to actual needs to achieve the objective of the solution of this embodiment. Those of ordinary skill in the art can understand and implement without any creative effort.

Through the description of the above implementations, those of ordinary skill in the art can clearly understand that each implementation mode may be implemented by means of software plus a necessary general hardware platform, and of course, may also be implemented through hardware. Based on such an understanding, the technical solutions described above essentially or a part that contributes to the conventional art may be manifested in a form of a software product. The software product may be stored in a computer-readable storage medium, such as a ROM/RAM, a magnetic disc, or an optical disc, and includes several instructions to enable one computer device (which may be a personal computer, a server, a network device, and the like) to perform the methods described in various embodiments or some parts of the embodiments.

Finally, it is to be noted that: the above embodiments are merely used for describing rather than limiting the technical solutions of the present disclosure. Although the present disclosure has been described in detail with reference to the foregoing embodiments, those of ordinary skill in the art are to be understood that they can still modify the technical solutions recorded in the foregoing embodiments or equivalently replace some of the technical features thereof; and these modifications or replacements do not make the essence of the corresponding technical solutions deviate from the spirit and scope of the technical solutions of the various embodiments of the present disclosure.

What is claimed is:

1. A picking robot, comprising:

a robot body, wherein the robot body comprises a processor; a plurality of first image collection modules and one second image collection module are mounted on the robot body; the robot body comprises a plurality of robotic arms; wherein each robotic arm has one corresponding first image collection module mounted nearby;

each first image collection module does not interfere with a corresponding robotic arm; the second image collection module is mounted at a position of a base of the robot body for determining a base coordinate system; and the processor is configured to:

determine, based on fruit tree images of respective sub-areas in an operation area that are collected by respective first image collection modules and the base coordinate system, global fruit positioning distribution information of the operation area, and determine, according to the global fruit positioning distribution information, respective fruit positioning distribution information of each robotic arm that indicates a sub-area where the robotic arm takes charge of picking, to control the robotic arms to perform collaborative operation.

2. The picking robot according to claim 1, wherein the robot body comprises a body main frame and a plurality of connecting rods mounted on the body main frame;

at least two robotic arms are mounted on each connecting rod; each connecting rod has respective first image collection modules corresponding to respective robotic arms, mounted thereon; and each first image collection module is located close to an end joint of the corresponding robotic arm.

3. The picking robot according to claim 1, wherein the robotic arm is a telescopic robotic arm; each first image collection module is mounted on one side, close to a gripper, of a corresponding telescopic robotic arm; and a central axis of a shooting visual angle of each first image collection module is consistent with a stretching and retracting direction of the corresponding telescopic robotic arm.

4. A fruit positioning method applied to a picking robot, wherein:

the picking robot comprises:

a robot body, wherein the robot body comprises a processor; a plurality of first image collection modules and one second image collection module are mounted on the robot body; the robot body comprises a plurality of robotic arms; wherein each robotic arm has one corresponding first image collection module mounted nearby; each first image collection module does not interfere with a corresponding robotic arm; the second image collection module is mounted at a position of a base of the robot body for determining a base coordinate system; and the processor is configured to implement the fruit positioning method, which comprises:

determining, based on fruit tree images of respective sub-areas in an operation area that are collected by respective first image collection modules and the base coordinate system, global fruit positioning distribution information of the operation area; and determining, according to the global fruit positioning distribution information, respective fruit positioning distribution information of each robotic arm that indicates a sub-area where the robotic arm takes charge of picking, to control the robotic arms to perform collaborative operation:

where determining the global fruit positioning distribution information of the operation area comprises:

obtaining the fruit tree images of the respective sub-areas in the operation area that are collected by the respective first image collection modules, and inputting the fruit tree images into a predefined target detection model to obtain two-dimensional bounding box information and a mask area of each fruit in each of the fruit tree images output by the predefined target detection model;

generating a three-dimensional point cloud of each fruit in the each of the fruit tree images by using the mask area of each fruit in the each of the fruit tree images and corresponding image depth information, and determining a first positioning coordinate point of each fruit in the each of the fruit tree images based on the three-dimensional point cloud and the two-dimensional bounding box information of each fruit in the each of the fruit tree images; and determining the global fruit positioning distribution information of the operation area based on a result obtained by transforming the first positioning coordinate point of each fruit in the each of the fruit tree images to the base coordinate system.

5. The fruit positioning method according to claim 4, wherein the determining a first positioning coordinate point of each fruit in the each of the fruit tree images based on the three-dimensional point cloud and the two-dimensional bounding box information of each fruit in the each of the fruit tree images comprises:

performing clustering calculation on the three-dimensional point cloud of each fruit in the each of the fruit tree images by using a point cloud clustering algorithm to determine a surface feature point of each fruit in the each of the fruit tree images;

generating a three-dimensional view frustum and a central line of the view frustum corresponding to each fruit in the each of the fruit tree images according to the two-dimensional bounding box information of each fruit in the each of the fruit tree images; and determining the first positioning coordinate point of each fruit in the each of the fruit tree images based on the central line of the view frustum and the surface feature point corresponding to each fruit in the each of the fruit tree images.

6. The fruit positioning method according to claim 5, wherein the determining the first positioning coordinate point of each fruit in the each of the fruit tree images based on the central line of the view frustum and the surface feature point corresponding to each fruit in the each of the fruit tree images comprises:

constructing a sphere with the surface feature point as a center of the sphere and a target length as a radius for each fruit in the each of the fruit tree images, wherein the target length is determined based on a depth value corresponding to the surface feature point;

determining two intersection points where the central line of the view frustum corresponding to each fruit in the each of the fruit tree images penetrates through a corresponding sphere thereof; and determining one of the two intersection points for each fruit in the each of the fruit tree images, which has a greater distance from a shooting focus as the first positioning coordinate point of each fruit in the each of the fruit tree images.

7. The fruit positioning method according to claim 6, wherein the determining the global fruit positioning distribution information of the operation area based on a result obtained by transforming the first positioning coordinate point of each fruit in the each of the fruit tree images to the base coordinate system comprises:

transforming the first positioning coordinate point of each fruit in the each of the fruit tree images to the base coordinate system to obtain a second positioning coordinate point of each fruit in the each of the fruit tree images in the base coordinate system;

determining a positioning coordinate point pair of adjacent fruits according to the second positioning coordinate point of each fruit in the base coordinate system, and determining a distance between two second positioning coordinate points in each positioning coordinate point pair in the base coordinate system;

determining those of positioning coordinate point pairs that have a distance less than a target threshold value as target positioning coordinate point pairs, and eliminating one of the second positioning coordinate points from each target positioning coordinate point pair; and generating the global fruit positioning distribution information of the operation area according to the second positioning coordinate points reserved in the base coordinate system.

8. The fruit positioning method according to claim 5, wherein the determining the global fruit positioning distribution information of the operation area based on a result obtained by transforming the first positioning coordinate point of each fruit in the each of the fruit tree images to the base coordinate system comprises:

transforming the first positioning coordinate point of each fruit in the each of the fruit tree images to the base coordinate system to obtain a second positioning coordinate point of each fruit in the each of the fruit tree images in the base coordinate system;

determining a positioning coordinate point pair of adjacent fruits according to the second positioning coordinate point of each fruit in the base coordinate system, and determining a distance between two second positioning coordinate points in each positioning coordinate point pair in the base coordinate system;

determining those of positioning coordinate point pairs that have a distance less than a target threshold value as target positioning coordinate point pairs, and eliminating one of the second positioning coordinate points from each target positioning coordinate point pair; and generating the global fruit positioning distribution information of the operation area according to the second positioning coordinate points reserved in the base coordinate system.

9. The fruit positioning method according to claim 4, wherein the determining the global fruit positioning distribution information of the operation area based on a result obtained by transforming the first positioning coordinate point of each fruit in the each of the fruit tree images to the base coordinate system comprises:

transforming the first positioning coordinate point of each fruit in the each of the fruit tree images to the base coordinate system to obtain a second positioning coordinate point of each fruit in the each of the fruit tree images in the base coordinate system;

determining a positioning coordinate point pair of adjacent fruits according to the second positioning coordinate point of each fruit in the base coordinate system, and determining a distance between two second positioning coordinate points in each positioning coordinate point pair in the base coordinate system;

determining those of positioning coordinate point pairs that have a distance less than a target threshold value as target positioning coordinate point pairs, and eliminating one of the second positioning coordinate points from each target positioning coordinate point pair; and generating the global fruit positioning distribution information of the operation area according to the second positioning coordinate points reserved in the base coordinate system.

10. The fruit positioning method according to claim 4, wherein the robot body comprises a body main frame and a plurality of connecting rods mounted on the body main frame;

at least two robotic arms are mounted on each connecting rod; each connecting rod has respective first image collection modules corresponding to respective robotic arms, mounted thereon; and each first image collection module is located close to an end joint of the corresponding robotic arm.

11. The fruit positioning method according to claim 4, wherein the robotic arm is a telescopic robotic arm; each first image collection module is mounted on one side, close to a gripper, of a corresponding telescopic robotic arm; and a central axis of a shooting visual angle of each first image collection module is consistent with a stretching and retracting direction of the corresponding telescopic robotic arm.

12. An electronic device for controlling a picking robot, comprising:

a memory, a processor, and a computer program, stored in the memory and capable of running on the processor, wherein a fruit positioning method is implemented when the processor executes the computer program, wherein the picking robot comprises:

a robot body, wherein a plurality of first image collection modules and one second image collection module are mounted on the robot body; the robot body comprises a plurality of robotic arms; wherein each robotic arm has one corresponding first image collection module mounted nearby; each first image collection module does not interfere with a corresponding robotic arm; the second image collection module is mounted at a position of a base of the robot body for determining a base coordinate system; and the fruit positioning method comprises:

determining, based on fruit tree images of respective sub-areas in an operation area that are collected by respective first image collection modules and the base coordinate system, global fruit positioning distribution information of the operation area; and determining, according to the global fruit positioning distribution information, respective fruit positioning distribution information of each robotic arm that indicates a sub-area where the robotic arm takes charge of picking, to control the robotic arms to perform collaborative operation, wherein determining the global fruit positioning distribution information of the operation area comprises:

obtaining the fruit tree images of the respective sub-areas in the operation area that are collected by the respective first image collection modules, and inputting the fruit tree images into a predefined target detection model to obtain two-dimensional bounding box information and a mask area of each fruit in each of the fruit tree images output by the predefined target detection model;

generating a three-dimensional point cloud of each fruit in the each of the fruit tree images by using the mask area of each fruit in the each of the fruit tree images and corresponding image depth information, and determining a first positioning coordinate point of each fruit in the each of the fruit tree images based on the three-dimensional point cloud and the two-dimensional bounding box information of each fruit in the each of the fruit tree images; and determining the global fruit positioning distribution information of the operation area based on a result obtained by transforming the first positioning coordinate point of each fruit in the each of the fruit tree images to the base coordinate system.

13. The electronic device according to claim 12, wherein the determining a first positioning coordinate point of each fruit in the each of the fruit tree images based on the three-dimensional point cloud and the two-dimensional bounding box information of each fruit in the each of the fruit tree images comprises:

performing clustering calculation on the three-dimensional point cloud of each fruit in the each of the fruit tree images by using a point cloud clustering algorithm to determine a surface feature point of each fruit in the each of the fruit tree images;

generating a three-dimensional view frustum and a central line of the view frustum corresponding to each fruit in the each of the fruit tree images according to the two-dimensional bounding box information of each fruit in the each of the fruit tree images; and determining the first positioning coordinate point of each fruit in the each of the fruit tree images based on the central line of the view frustum and the surface feature point corresponding to each fruit in the each of the fruit tree images.

14. The electronic device according to claim 13, wherein the determining the first positioning coordinate point of each fruit in the each of the fruit tree images based on the central line of the view frustum and the surface feature point corresponding to each fruit in the each of the fruit tree images comprises:

constructing a sphere with the surface feature point as a center of the sphere and a target length as a radius for each fruit in the each of the fruit tree images, wherein the target length is determined based on a depth value corresponding to the surface feature point;

determining two intersection points where the central line of the view frustum corresponding to each fruit in the each of the fruit tree images penetrates through a corresponding sphere thereof; and determining one of the two intersection points for each fruit in the each of the fruit tree images, which has a greater distance from a shooting focus as the first positioning coordinate point of each fruit in the each of the fruit tree images.

15. The electronic device according to claim 12, wherein the determining the global fruit positioning distribution information of the operation area based on a result obtained by transforming the first positioning coordinate point of each fruit in the each of the fruit tree images to the base coordinate system comprises:

transforming the first positioning coordinate point of each fruit in the each of the fruit tree images to the base coordinate system to obtain a second positioning coordinate point of each fruit in the each of the fruit tree images in the base coordinate system;

determining a positioning coordinate point pair of adjacent fruits according to the second positioning coordinate point of each fruit in the base coordinate system, and determining a distance between two second positioning coordinate points in each positioning coordinate point pair in the base coordinate system;

determining those of positioning coordinate point pairs that have a distance less than a target threshold value as target positioning coordinate point pairs, and eliminating one of the second positioning coordinate points from each target positioning coordinate point pair; and generating the global fruit positioning distribution information of the operation area according to the second positioning coordinate points reserved in the base coordinate system.

* * * * *